United States Patent
Chorley et al.

(10) Patent No.: US 7,725,426 B2
(45) Date of Patent: May 25, 2010

(54) LOT/SERIAL ENGINE FOR A WAREHOUSE MANAGEMENT SYSTEM

(75) Inventors: Jon S. Chorley, Mill Valley, CA (US); Raymond Ngai, Campbell, CA (US); Manju Juneja, Belmont, CA (US); Mani Rana, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1856 days.

(21) Appl. No.: 10/327,227

(22) Filed: Dec. 20, 2002

(65) Prior Publication Data

US 2009/0048947 A1 Feb. 19, 2009

Related U.S. Application Data

(60) Provisional application No. 60/384,226, filed on May 29, 2002.

(51) Int. Cl.
*G06F 17/30* (2006.01)

(52) U.S. Cl. ............ 707/104.1; 707/1; 455/422.1; 235/385

(58) Field of Classification Search ............ 707/104.1; 455/422.1; 235/385
See application file for complete search history.

(56) References Cited

U.S. PATENT DOCUMENTS

| | | | |
|---|---|---|---|
| 6,745,027 B2 * | 6/2004 | Twitchell, Jr. | 455/422.1 |
| 6,843,415 B2 * | 1/2005 | Vogler | 235/385 |
| 7,149,753 B2 * | 12/2006 | Lin | 707/104.1 |
| 2004/0098284 A1 * | 5/2004 | Petito et al. | 705/1 |

* cited by examiner

*Primary Examiner*—Yicun Wu
(74) *Attorney, Agent, or Firm*—Townsend and Townsend and Crew LLP

(57) ABSTRACT

A novel method for configuring an item specific user-definable lot or serial attribute. The method also provides for grouping one or more attributes into an time specific context. The method also provides for capturing, maintaining and querying attribute data values according to the item specific context.

22 Claims, 11 Drawing Sheets

FIGURE 4A

| LOT TABLE PROPERTIES | NULL? | TYPE | CONSTRAINTS |
|---|---|---|---|
| ITEM — 402 | NOT NULL | VARCHAR2(50) | COMPOSITE PRIMARY KEY |
| LOT — 404 | NOT NULL | VARCHAR2(30) | COMPOSITE PRIMARY KEY |
| CONTEXT — 406 | | VARCHAR2(50) | FOREIGN KEY |
| DESCRIPTION | | VARCHAR2(150) | |
| VENDOR | | VARCHAR2(30) | |
| COUNTRY OF ORIGIN | | VARCHAR2(30) | |
| GRADE | | VARCHAR2(30) | |
| DATE CODE | | DATE | |
| AGE | | NUMBER | |
| BEST BY DATE | | DATE | |
| EXPIRATION DATE | | DATE | |
| D_ATTRIBUTE_1 | | DATE | |
| D_ATTRIBUTE_2 | | DATE | |
| N_ATTRIBUTE_1 | | NUMBER | |
| N_ATTRIBUTE_2 | | NUMBER | |
| A_ATTRIBUTE_1 | | VARCHAR2(150) | |
| A_ATTRIBUTE_2 | | VARCHAR2(150) | |

LOT ATTRIBUTES — 410

FIGURE 4B

LOT TABLE

| ITEM | LOT | CONTE | DESCR | VENDO | | D_ATTR | D_ATTR | N_ATTR | N_ATTR | A_ATTR | A_ATTR |
|---|---|---|---|---|---|---|---|---|---|---|---|
| GRAPE | 103 | CONDI | | XYZ MA | | | | 50 | | | |
| T-SHIR | | SUMM | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

PRE-DEFINED LOT ATTRIBUTES — 420

USER DEFINED ATTRIBUTES — 430

FIGURE 5B

| FLEX FIELD TABLE PROPERTIES | | | |
|---|---|---|---|
| | NULL? | TYPE | CONSTRAINTS |
| ITEM | NOT NULL | VARCHAR2(50) | |
| FLEX FIELD COLUMN N | | VARCHAR2(50) | |
| DESCRIPTIVE FLEX FIE | | VARCHAR2(50) | |

550

| FLEX FIELD TABLE | | |
|---|---|---|
| ITEM | FLEX FIELD COLUMN NAME | DESCRIPTIVE FLEX FIELD NAME |
| GRAPE JA | N_ATTRIBUTE_1 | QUANTITY |
| T-SHIRT | A_ATTRIBUTE_1 | COLOR |
| T-SHIRT | A_ATTRIBUTE_2 | SIZE |

FIGURE 6B

CONTEXT TABLE PROPERTIES

| | NULL? | TYPE | CONSTRAINTS |
|---|---|---|---|
| ITEM | NOT NULL | VARCHAR2(50) | |
| CONTEXT | NOT NULL | VARCHAR2(50) | |
| ATTRIBUTE | NOT NULL | VARCHAR2(50) | |
| VALIDATION | | | |
| DEFAULT VALUE | | | |

{ 650

CONTEXT TABLE

| ITEM | CONTEXT | ATTRIBUTE | VALIDATION | DEFAULT VALUE |
|---|---|---|---|---|
| GRAPE JAM | CONDIMENT | VENDOR | | XYZ MANUFACTURER |
| GRAPE JAM | CONDIMENT | QUANTITY | | |
| T-SHIRT | SUMMER SEA | VENDOR | | |
| T-SHIRT | SUMMER SEA | COLOR | | |
| T-SHIRT | SUMMER SEA | SIZE | | |

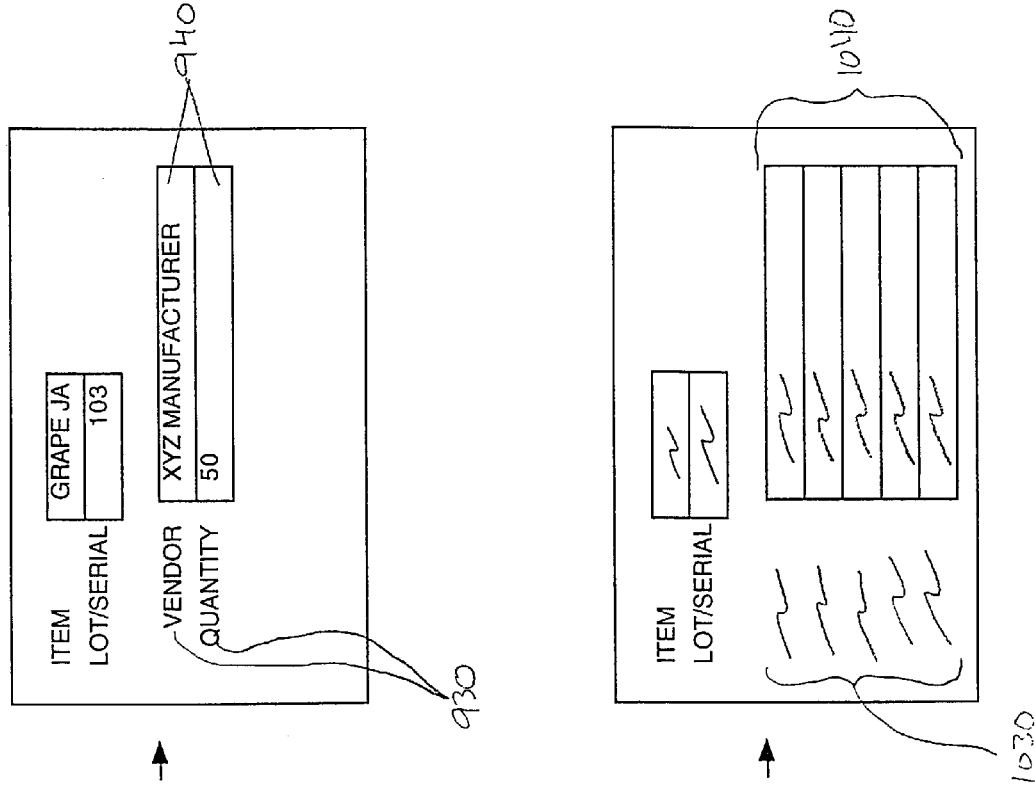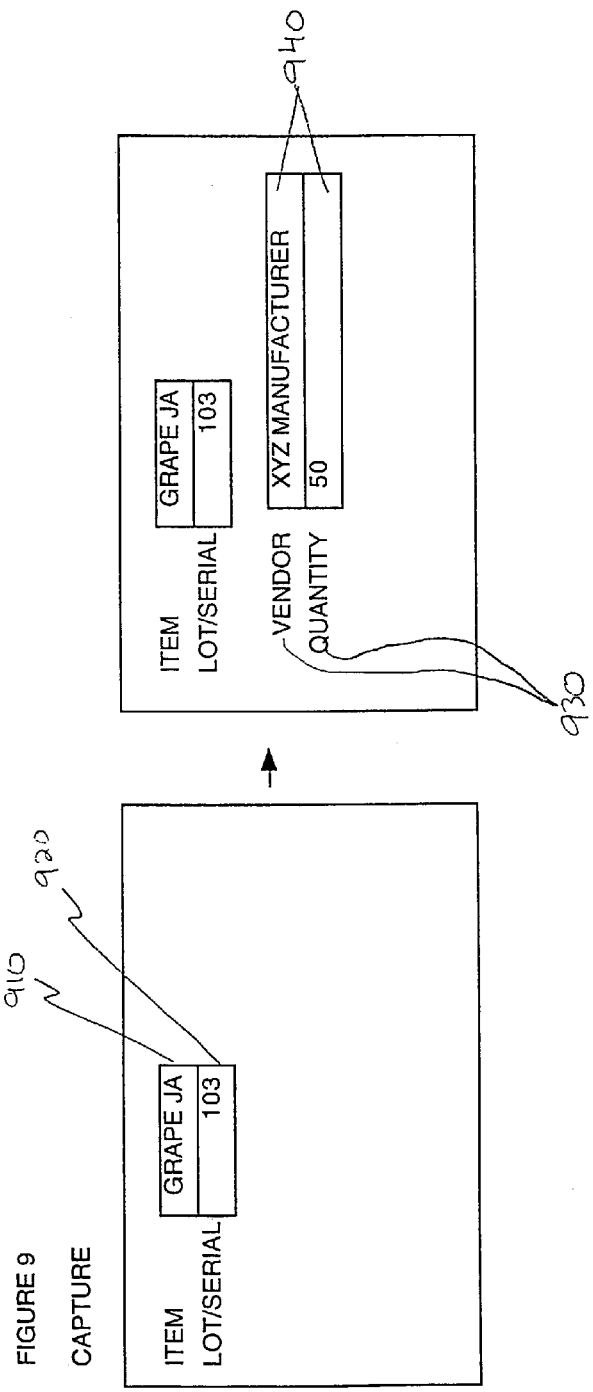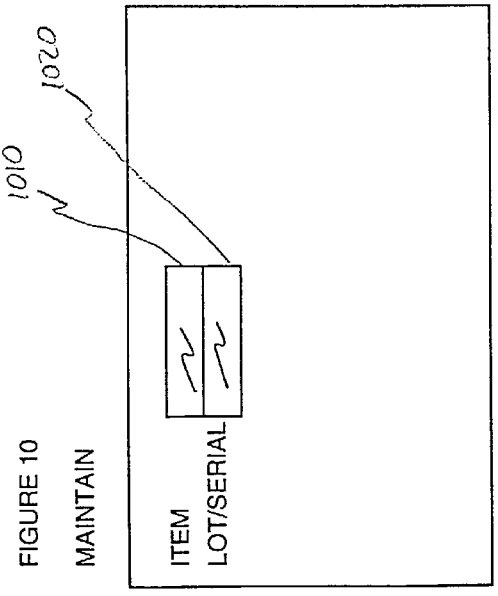
FIGURE 9
CAPTURE
FIGURE 10
MAINTAIN

LOT/SERIAL ENGINE FOR A WAREHOUSE MANAGEMENT SYSTEM

CROSS-REFERENCE TO RELATED APPLICATION

This application claims the benefit of U.S. Provisional Application No. 60/384,226, filed May 29, 2002.

FIELD OF THE INVENTION

Embodiments of the present invention relate to data management, and more particularly to user configurable and context sensitive data management.

BACKGROUND OF THE INVENTION

A lot or serial is used to identify a particular unit of an item or a group of units within an item. Lot attributes are fields in addition to the lot number that provide additional information about a lot. Lot attributes describe the material characteristics of the lot. Similarly, serial attributes are fields in addition to the serial number that provide additional information about a unit. Serial attributes describe the material characteristics of the unit.

For example, in addition to a lot number, an item may be further described by lot attributes such as: creation date, kill date, age, best by date, expiration date, date code, last modified date, maturity date, expiration date, grade, color, curl/wrinkle/fold, recycled content percentage, size, thickness, thickness unit of measure (UOM), length, length UOM, volume, volume UOM, weight per area, weight UOM, area UOM, width, width UOM, country of origin, place of origin, vendor, supplier lot number, lot description, bacteria, brix scale, concentration, flavor, ink receptivity, moisture content, percentage fat, percent solid by volume, percent solids by weight, pH, potency, protein content, purity, saltiness, smell, strength, sugar content, tear, and the like. In addition to a serial number, an item may be further described by serial attributes such as: country of origin, origination dates, counters, and the like.

Every industry and every company has their own lot and/or serial attributes that they need to track. This includes capturing the attributes at the time of receipt into inventory, maintaining these attributes, viewing on-hand balances and available quantities by these attributes, supporting a range of business logic based on these attributes throughout manufacturing and distribution, and the like.

For example, a user in the chemical manufacturing industry may need to track: the creation date (for purchased items this is either the date the lot was created at the supplier or the receipt date, for manufactured items it is the date on which the lot was produced), used for replenishment and production planning; the age (days after the creation date of the lot), for use in replenishment planning; best by date, for use in production planning; date code (date of packaging or assembly), used for replenishment planning; last modified date, for use in production planning; supplier, used to identify the source of material when supplied by multiple sources; volume, used for replenishment and production planning; grade (quality), used for production planning, pricing and costing; and the like.

A user in the food and beverage distribution industry may need to track: the expiration date, used in picking rules and replenishment planning; grade (quality), used for picking rules, pricing and costing; the place of origin, used in picking rules and tracking; supplier, used to identify the source of material when supplied by multiple sources; the quantity, used in replenishment planning and picking rules; the quantity unit of measure (e.g. palate, case, each) used in replenishment planning and picking rules; and the like.

A user in the automotive service and repair may need to track the vehicle serial number; in service date, used in replacement; the date of last service; items serviced, used in part stock management; next scheduled service date, used in schedule planning and parts purchasing; mileage, used in replacement planning; and the like Currently, systems provide all lot and/or serial attributes that the system is capable of capturing, not just the lot and/or serial attributes that a user is interested in. For example, the system may be seeded with fields for capturing fifty attributes commonly used by manufacturing and distribution industries such as: biotechnology, chemical, food and beverage; fragrance, medical, metals, paint and coating, pharmaceutical; pulp and paper, semiconductor, and textiles. Such systems, while reducing systems costs by being applicable to a broad range of users, are not readily usable. The user is prompted to enter attributes that are not relevant to the particular users needs. For example, the data entry user interface provides for entering all fifty lot and/or serial attributes, although the user may only need to track 15-20 of the lot and/or serial attributes.

Alternatively, current systems are configured by the vendor for the specific application, such as food and beverage distribution. In such system, the user is only prompted for and provided with lot and serial attribute relevant to the users particular needs. However, such system are more costly because the custom configuration reduces the economy of scale cost saving achieved in generic systems.

Furthermore, the existing list of lot and serial attributes that a particular user needs to track changes from user to user. New lot and serial attributes are also regularly being added to the list of attributes that need to be tracked by such users. Therefore, current systems must be modified by the system vendor to accommodate such changes.

In addition, the lot and serial attributes to be captured vary from item to item and/or item category to item category. Thus a user currently is prompted for irrelevant attributes, or the user has to pay significant additional costs to have the system vendor further customize the system.

Therefore, there is a need for a system that is readily configurable by the user for handling lot and/or serial attributes relevant to the particular user's needs. Furthermore, there is a need for a system that provides for user-definable lot and/or serial attributes. The definition and use of the attributes must be extremely flexible and item-specific such that users are only prompted to enter the necessary attributes for a particular item.

SUMMARY OF THE INVENTION

The present invention is readily configurable by the user for handling lot and/or serial attributes relevant to the particular user's needs. The present invention also provides for user-definable lot and/or serial attributes.

In one embodiment, the present invention provides for configuring an item specific user-definable lot or serial attribute. The present invention also provides for grouping one or more attributes into an time specific context. The present invention also provides for capturing attribute data values according to the item specific context. The present invention also provides for maintaining attribute data values according to the item specific context. The present invention also provides for querying attribute data values according to the item specific context.

The definition and use of the attributes is flexible and item-specific such that the system handles (capture, maintain, query) lot and serial attributes specific to the users needs. The user is only prompted to enter the necessary attributes for the particular item. The user is also provided with the attribute data values corresponding to the particular item. Hence, the attribute structure may be different for different items. The attribute structure for each item is also specific to the users industry and particular needs.

BRIEF DESCRIPTION OF THE DRAWINGS

The present invention is illustrated by way of example and not by way of limitation, in the figures of the accompanying drawings and in which like reference numerals refer to similar elements and in which:

FIG. 4A shows a diagram of a lot attribute table properties, in accordance with one embodiment of the present invention.

FIG. 4B shows a diagram of a lot attribute table, in accordance with one embodiment of the present invention.

FIG. 5B shows a diagram of a flex field table, in accordance with one embodiment of the present invention.

FIG. 6B shows a diagram of a context table in accordance with one embodiment of the present invention.

FIG. 9 shows a graphical user interface for capturing lot and/or serial attribute data values, in accordance with one embodiment of the present invention.

FIG. 10 shows a graphical user interface for maintaining lot and/or serial attribute data values, in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention provides for flexible and item-specific creation and organization of lot and/or serial attributes such that users can configure a warehouse management system to capture, maintain, and query only those attributes specific to the users needs. Users decide what attributes they want to capture for a particular item or group of items. To such ends, the users have the ability to define lot and/or serial attributes. The users also have the ability to group lot and/or serial attributes into contexts.

Figure 1:
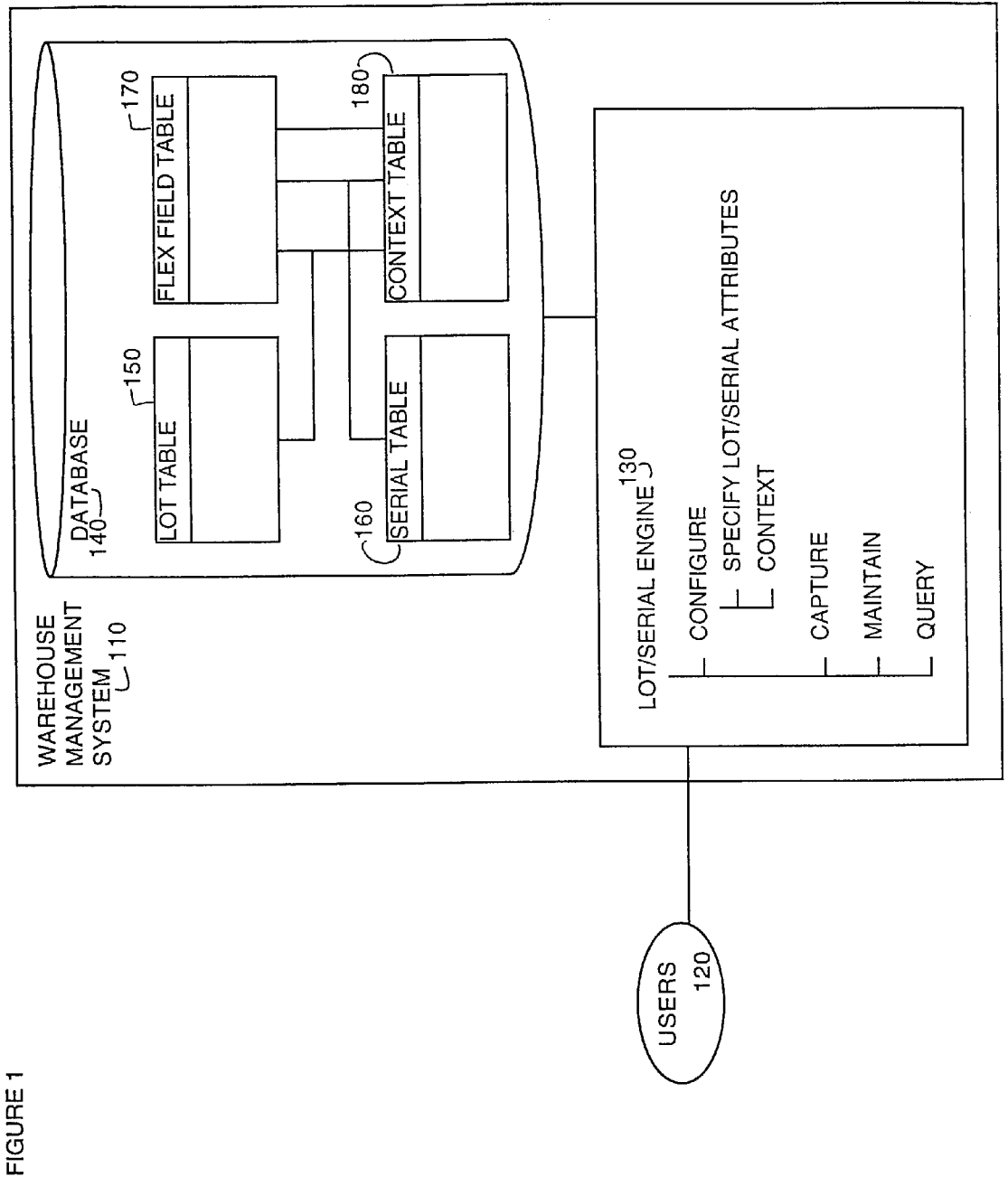
FIG. 1 shows a diagram of a system for specifying lot and/or serial attributes, in accordance with one embodiment of the present invention.

Referring now to FIG. 1, a diagram of a system for specifying lot and/or serial attributes in a warehouse management system 110 in accordance with one embodiment of the present invention is shown. As depicted in FIG. 1, users 120 are connected to a lot/serial engine 130 within the warehouse management system 110. The lot/serial engine 130 allows the users 120 to configure, capture, maintain, and query lot and/or serial attributes. The lot/serial engine 130 utilizes a plurality of database 140 tables to provide for configuration, capture, maintenance and querying of lot and or serial attributes. The database 140 includes a lot table 150, a serial table 160, a flex field table 170, a context table 180, among others.

The lot table 150 includes a number of flex field columns for storing lot attribute data values. The serial table 160 includes a number of flex field columns for storing serial attribute values. The flex field table 170 provides for mapping descriptive flex field names to the flex field column names in the lot and serial tables. The flex field column names are internal references for the item specific lot or serial attributes. The descriptive flex field names allow for assigning user friendly lot or serial attribute names to the flex field column names. The context table 180 provides for grouping of lot and/or serial attributes, specific to each item.

Those skilled in the art will appreciate that the above description of the number of table and their organization are presented to illustrate the concept of the invention. Those skilled in the art will appreciate that the number and organization of the table will vary in a commercial embodiment to achieve optimal performance of the present invention.

Figure 2:
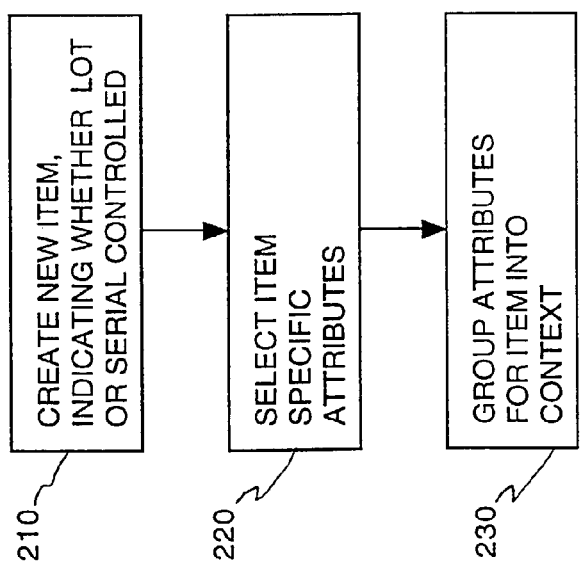
FIG. 2 shows a flow diagram of the process for configuring lot and/or serial attributes for an item, in accordance with one embodiment of the present invention.

Referring now to FIG. 2, a flow diagram of the process for configuring lot and/or serial attributes for an item in accordance with one embodiment of the present invention is shown. As depicted in FIG. 2, whenever a user creates a new item, the user is able to indicate whether the item is lot and/or serial controlled, at step 210. If the item is lot and/or serial controlled, the user also selects lot and/or serial attributes for the item, at step 220. Such lot and/or serial attributes are fields that provide additional information about the lot and/or serial.

The process also allows the user to group the selected lot and/or serial attributes that are common to the item at step 230. Grouping lot or serial attributes, allows a user to specify a context (set of attributes) for the item. Therefore users do not have to capture, maintain, process and the like, everything that a system is capable of handling. By grouping attributes according to an item-specific context, the system is capable of handling attributes relevant to the specific item or group of items.

Figure 3:
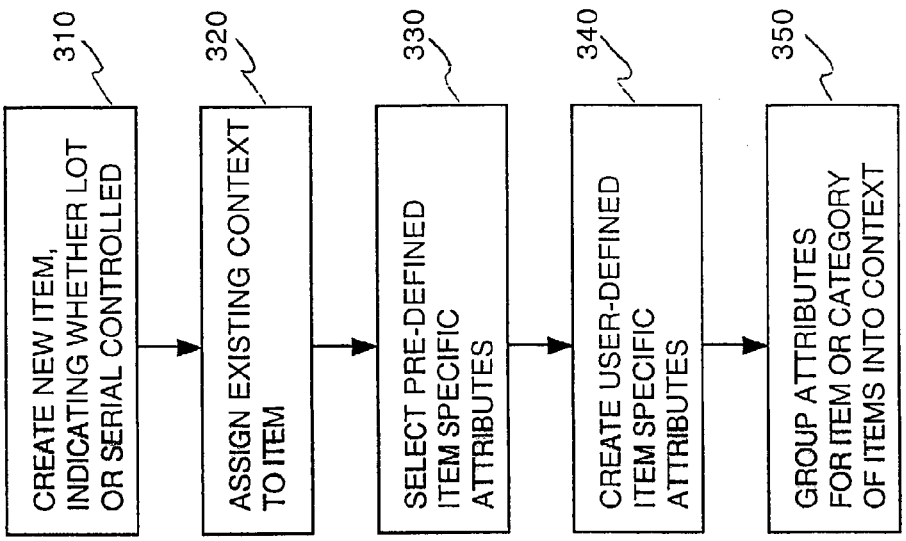
FIG. 3 shows a flow diagram of the process for configuring lot and/or serial attributes for an item, in accordance with one embodiment of the present invention.

Referring now to FIG. 3, a flow diagram of a process for configuring lot and/or serial attributes for an item in accordance with one embodiment of the present invention is shown. As depicted in FIG. 3, whenever a user creates a new item, the user is able to indicate whether the item is lot and/or serial controlled, at step 310. If the item is lot or serial controlled, the user also selects one or more pre-defined lot or serial attributes, at step 330. The user can also create one or more user-defined lot or serial attributes for the item, at step 340.

The user-definable attributes allow the user to capture additional attributes that are unique to a user. In one implementation, the user-defined lot or serial attributes are created using flex fields. A flex field is an item and/or item category specific field capable of storing attribute data values, which can be configured by the user.

The process also allows the user to group the selected pre-defined attributes and user-defined attributes that are common to the item or category of items, at step 350. Grouping the pre-defined and user-defined attributes allows a user to specify a context (set of lot or serial attributes) for the item or category of items. Thus, by grouping attributes according to an item-specific context, a system is capable of capturing, maintaining, processing and the like (hereinafter referred to as handling), only attributes relevant to the specific item or group of items. The user does not to have to enter or view everything that the system is capable of handling.

In addition to selecting attributes and then categorizing them into a context (grouping) 330, 340, 350, the user can also select attributes by assigning an existing context to the item, at step 320.

Referring now to FIGS. 4A-4B, a diagram of a lot attribute table, in accordance with one embodiment of the present invention is shown. The lot attribute table is comprised of various fields, such as: item 402, lot 405, context 406, description, vendor, country of origin, grade, date code, age, best by date, expiration date, d_attribute_1, d_attribute_2, n_attribute_1, n_attribute_2, a_attribute_1, and a_attribute_2 410. Such fields are used for storing item, lot and lot attribute data values. Some fields are used for storing pre-defined lot attribute 420. Some fields are used for storing user-definable lot attributes 430. Each lot of an item is listed as a record in the lot table.

A similar table can be utilized for storing item, serial and serial attribute data values. For the sake of brevity the serial table is not illustrated herein. Furthermore, those skilled in the art will appreciate that the above description of the lot table is presented to illustrate the concept of the invention. Those skilled in the art will also appreciate that the number of tables and organization of the tables will vary in a commercial embodiment to achieve optimal performance of the present invention.

Figure 5A:
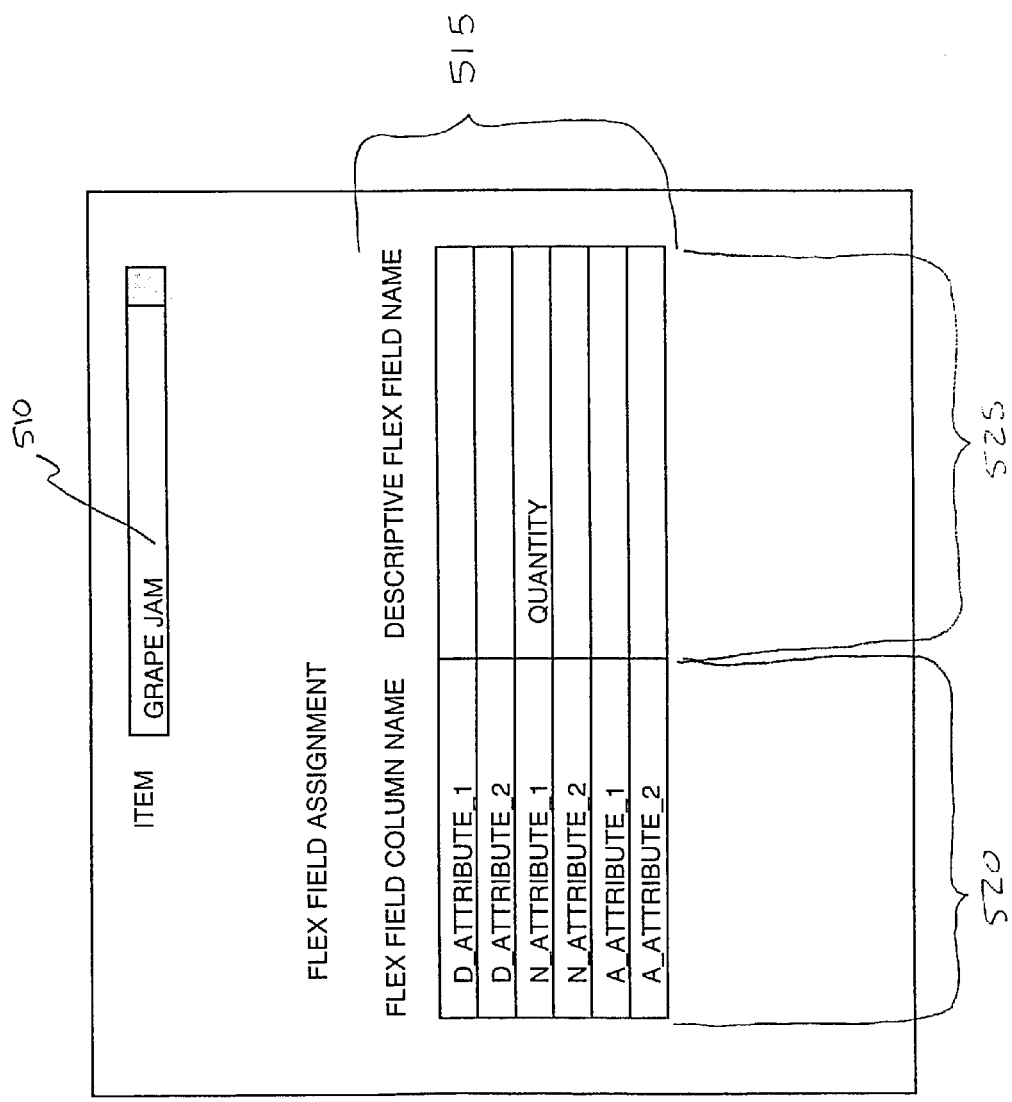
FIG. 5A shows a graphical user interface for configuring lot attributes, in accordance with one embodiment of the present invention.

Referring now to FIG. 5A, a graphical user interface for configuring lot attributes in accordance with one embodiment of the present invention is shown. As depicted in FIG. 5A, the graphical user interface is comprised of an item dialog box 510, and a flex field assignment list of values (LOV) 515.

A user enters an item (e.g. grape jam) in the item dialog box 510. The flex field assignment LOV 515 provides the lot attribute names (i.e. flex filed column name) 520. The user may specify a user friendly descriptive flex field name (e.g. quantity) for a particular user-definable flex field column name 525.

Referring now to FIG. 5B, a diagram of a flex field table in accordance with one embodiment of the present invention is shown. As depicted in FIG. 5B, the flex field table is comprised of various fields, such as item, flex field column name, and descriptive flex field name 550. The flex field table maps the descriptive user defined attribute for each item to a particular flex field column in a lot and/or serial table.

Those skilled in the art will appreciate that the above description of the flex field table is presented to illustrate the concept of the invention. Those skilled in the art will also appreciate that the number of tables and organization of the tables will vary in a commercial embodiment to achieve optimal performance of the present invention.

Figure 6A:
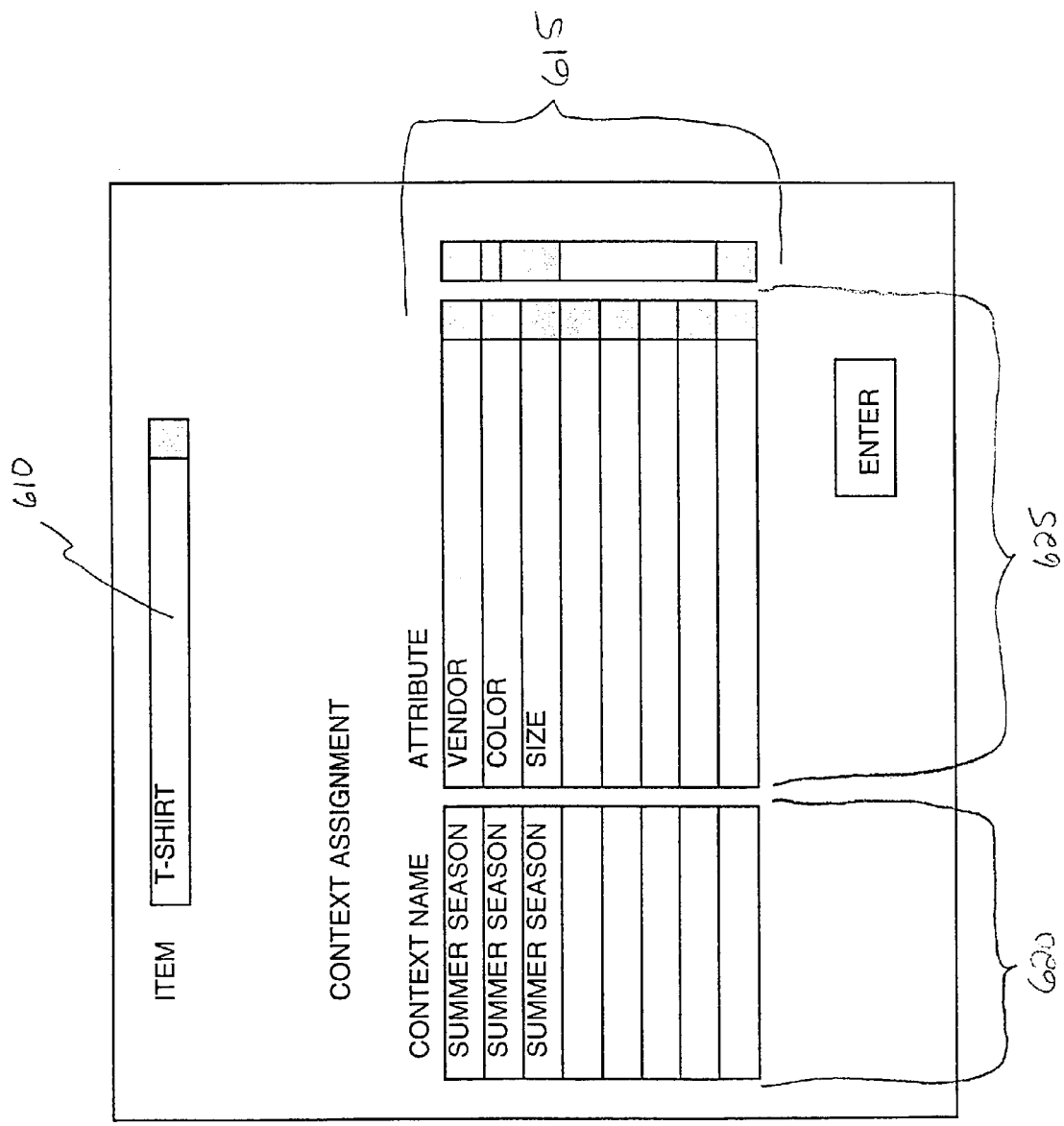
FIG. 6A shows a graphical user interface for grouping attributes into contexts, in accordance with one embodiment of the present invention.

Referring now to FIG. 6A, a graphical user interface for grouping attributes into contexts, in accordance with one embodiment of the present invention is shown. As depicted in FIG. 6A, the graphical user interface is comprised of an item dialog box 610, and a context assignment list of values (LOV) 615.

A user enters an item (e.g. t-shirt) in the item dialog box 610. A user specifies a context (e.g. summer season) 620 and selects a pre-defined or user defined attribute name (e.g. vendor, color, size) from a pull down menu 625.

Referring now to FIG. 6B, a diagram of a context table in accordance with one embodiment of the present invention is shown. As depicted in FIG. 6B, the context table is comprised of various fields, such as item, context name, attribute name (i.e. descriptive flex field name), validation, and default value 650. The context table groups the applicable attributes for each item or group of items (i.e. category).

Those skilled in the art will appreciate that the above description of the context table is presented to illustrate the concept of the invention. Those skilled in the art will also appreciate that the number of tables and organization of the tables will vary in a commercial embodiment to achieve optimal performance of the present invention.

Figure 7:
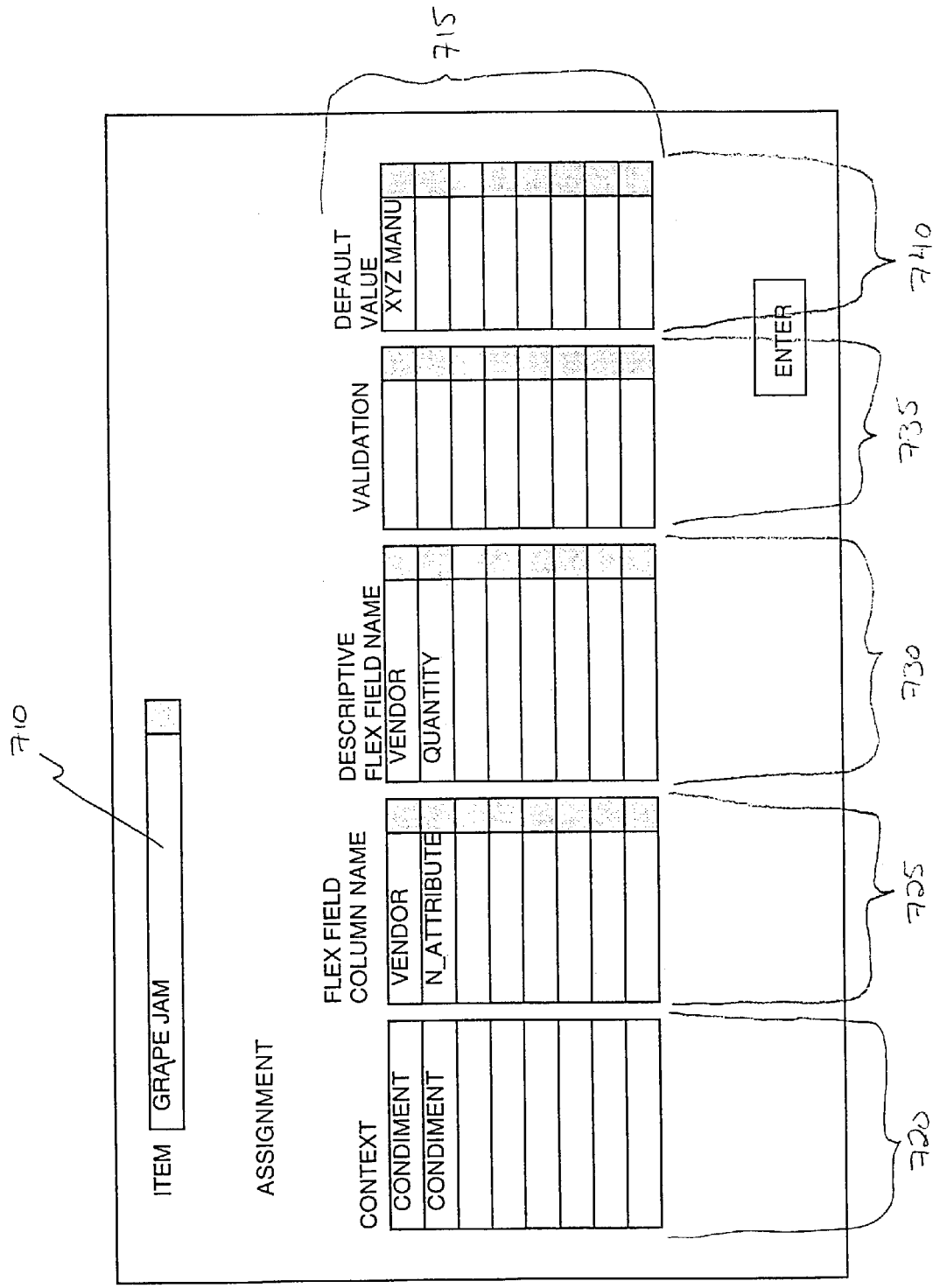
FIG. 7 shows a graphical user interface for grouping attributes into contexts and configuring attributes, in accordance with one embodiment of the present invention.

Referring now to FIG. 7, a graphical user interface for grouping attributes into contexts and configuring attributes, in accordance with one embodiment of the present invention is shown. As depicted in FIG. 7, the graphical user interface is comprised of an item dialog box 710, and a assignment list of values (LOV) 715.

A user enters an item (e.g. grape jam) in the item dialog box. The user also specifies a context (e.g. condiment) in the context column 720. The user also selects a pre-defined attribute or user-definable flex field column name from a pull down list 725. If the user selects a user-definable flex field name, the user also specifies a descriptive flex field name 730. In addition, the user may also specify a validation 735 for the attribute with respect to the specified item. The use may also specify a default value 740 for the attribute with respect to the specified item.

For example, as illustrated in FIG. 7 a user has enter the item grape jam and specified a context of condiment. In the assignment LOV, the user has also selected the pre-defined attribute of vendor and flex field column name of n_attribute_1 as attributes to be grouped in the condiment context. For n_attribute_1 the user has assigned the user friendly attribute name of quantity. The user has also specified a default value of xyz manufacturer for the attribute vendor. Referring back to FIG. 6B, the context table is shown populated with the corresponding context information. Similarly the flex field table, FIG. 5B, is shown populated with the corresponding context.

Figure 8:
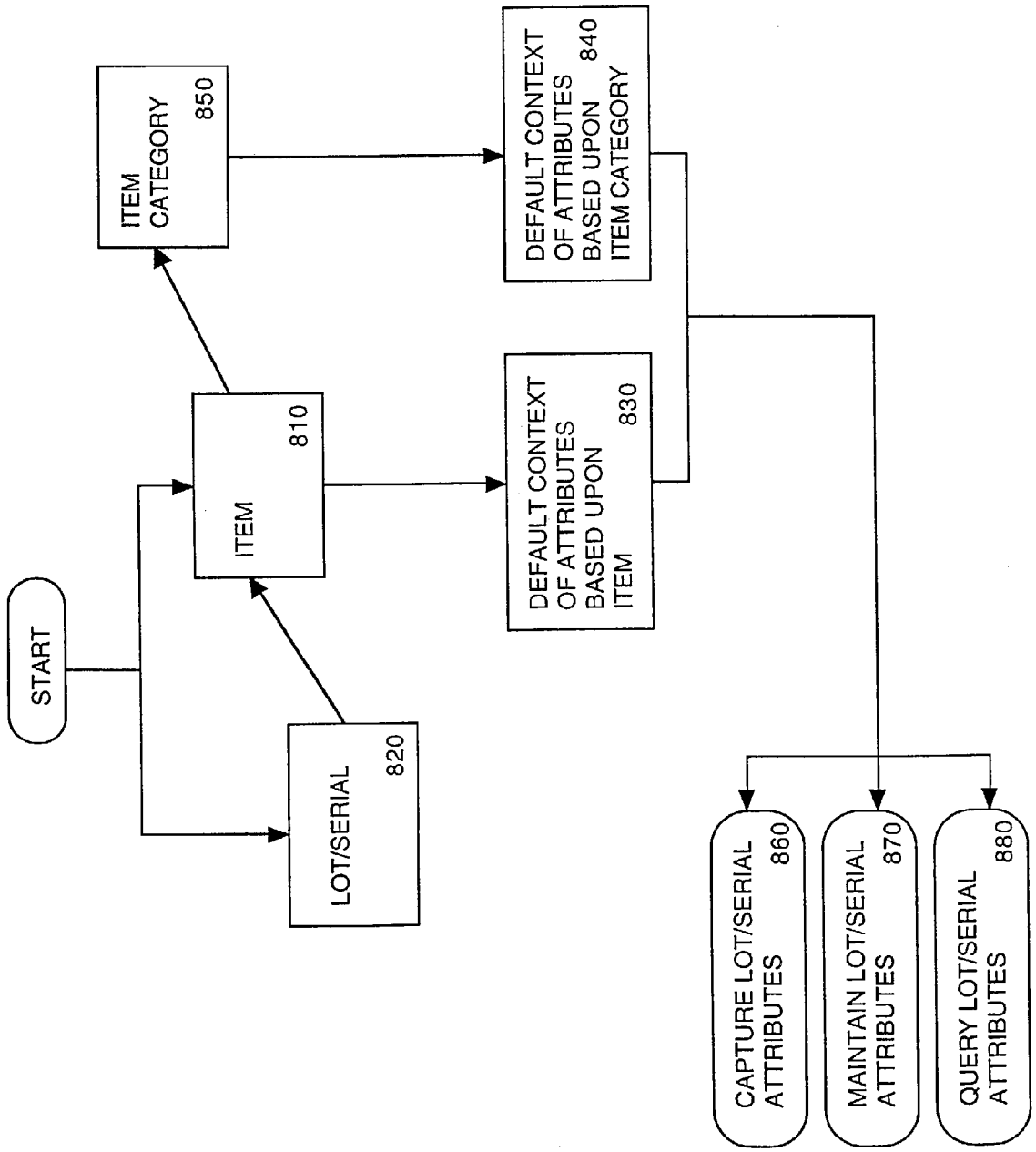
FIG. 8 shows a diagram of various processes performed by an attribute engine, in accordance with one embodiment of the present invention.

Referring now to FIG. 8, a diagram of various processes performed by an attribute engine, in accordance with one embodiment of the present invention, is shown. The user first enters the item 810, and/or lot or serial 820 of the item. From the item 810, the attribute engine is capable of defaulting the proper grouping of attributes (context) 830. If the item also belongs to a category of items 850, the attribute engine is capable of defaulting the proper grouping of attributes (context) 840 corresponding to the item category 850. The proper context is therefore automatically defaulted to when transacting an item.

As a result, in one implementation, the attribute engine is capable of prompting the user for the item specific lot and/or serial attributes in accordance with the context for the item and/or item category. Lot and/or serial attributes context-specific to the particular item are captured 860.

For example, attribute data values are captured whenever a user enters a new lot or serial for an existing item. The captured lot and/or serial attributes are context-specific to the particular item or category of items. The lot and/or serial attributes captured, only include pre-defined and user-defined attributes that are context enabled for the specific item or the category of items.

In another example, a new lot can be created in advance of receipt. The user creates new lots with default lot attributes before receipt of any on-hand quantities for an item in the specific lot.

In another implementation the attribute engine is capable of providing the user with just the lot and/or serial attributes for the specific item in accordance with the context for the item and/or item category. The user can then maintain such lot and/or serial attributes 870.

For example, attribute data values are maintained whenever a user enters an existing lot or serial of an existing item. The attribute engine provides the user with the current lot and/or serial data values for the corresponding item. In one configuration the user can only view data values. In another configuration the user can view and change data values.

In yet another implementation the user is able to query the warehouse management system utilizing the lot and or serial attributes specific to the particular item, along with other information stored in the warehouse management system 880. The result set, from such a query, will return only those lot and or serial attributes specific to the items queried.

For example, users can query on-hand and available quantities by lot and/or serial attributes for a given item. Users are able to specify the value of any of the lot or serial attributes that have been configured in advance to query on-hand and available quantities. Users specify the lot and/or serial attribute using the descriptive field name defined for the attribute. Certain attributes can be indexed to improve performance.

In another example, users can define directed picking and putaway rules using lot and/or serial attributes. Users specify the lot and/or serial attribute using the descriptive field name defined for the attribute. The underlying flex field names are transparent to the user and picking and putaway rules.

The ability to assign meaningful names to the flex field column facilitates ad hoc reporting. Instead of querying using the cryptic flex field column names (e.g. d_attribute_1, d_attribute_2, n_attribute_1, n_attribute_2, a_attribute_1, a_attribute_2, and the like) a user can query using descriptive flex field names representative of the lot and/or serial attribute (e.g. date received, expiration date, service count, and the like).

Referring now to FIG. 9, a graphical user interface for capturing lot and/or serial attribute data values in accordance with one embodiment of the present invention is shown. As depicted in FIG. 9, the graphical user interface prompts the user to enter an item number 910, lot number and or serial number 920. The item number, lot number and/or serial number enables the proper grouping of attributes (context) to be displayed 930 along with dialog boxes for entering the corresponding attribute data values 940. Hence, all lot and/or serial attributes for the item are captured in a single window.

For example, as shown in FIG. 9 the user enters the item "grape jam" in the item dialog box 910, and lot number "103" in the lot/serial dialog box 920. The system then displays the context sensitive attributes, vendor and quantity 930, for the particular item being captured. The default value "xyz manufacturer", as illustrated in FIG. 7, also appear in the vendor dialog box 940. The user may specify a value in the quantity dialog box, for example "50". Now referring back to FIG. 4B, the captured values populated in the lot table is illustrated.

Referring now to FIG. 10, a graphical user interface for maintaining lot and/or serial attribute data values, in accordance with one embodiment of the present invention, is shown. As depicted in FIG. 10, the graphical user interface prompts the user to enter an item number 1010, lot number and or serial number 1020. The item number, lot number and/or serial number enables the proper grouping of attributes (context) to be displayed 1030 along with the current data values in dialog boxes 1040. Hence, the current data values for all lot and/or serial attributes of the specified item are displayed and updated in a single window.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a warehouse management system, a method comprising:
   receiving a specification of an item from a user of the warehouse management system;
   receiving control data from the user, the control data indicating whether the specified item is lot controlled, serial controlled, or both lot and serial controlled;
   receiving a specification of one or more attributes of the item from the user;
   receiving a specification of a context defined by the one or more attributes specified for the item, the context representing a subset of attributes defined in the warehouse management system that are specific to the item;
   storing, in a computer-readable storage medium, a database record linking the context to the specified item;
   receiving a selection of a flex field from the user, the flex field being capable of storing attribute data values;
   receiving a selection of a user definable attribute of the item;
   receiving a specification of a descriptive flex field name from the user;
   storing, in a computer-readable storage medium, a database record linking the descriptive flex field name to the flex field;
   storing the descriptive flex field name and the user definable attribute in a flex field table, the flex field table providing a mapping of the descriptive flex field name to an internal flex field name in a lot table, a serial table, or both;
   storing, in a computer-readable storage medium, a database record assigning the context to the item; and
   displaying a record of the item indicating that the item is assigned to the specified context, the context including the user definable attribute.

2. The method according to claim 1, wherein at least one of the one or more attributes is a pre-defined attribute.

3. The method according to claim 1, wherein at least one of the one or more attributes is a user-defined attribute.

4. The method according to claim 1, wherein at least one of the one or more attributes is a lot attribute.

5. The method according to claim 1, wherein at least one of the one or more attributes is a serial attribute.

6. The method of claim 1, wherein the flex field is configurable by the user, and the flex field is specific to the item.

7. The method of claim 1, wherein the flex field is configurable by the user, and the flex field is specific to a category of the item.

8. A computer-readable storage medium storing a plurality of instruction which, when executed by a processor, cause the processor to perform a method comprising:
receiving a specification of an item from a user of the warehouse management system;
receiving control data from the user, the control data indicating whether the specified item is lot controlled, serial controlled, or both lot and serial controlled;
receiving a specification of one or more attributes of the item from the user;
receiving a specification of a context defined by the one or more attributes specified for the item, the context representing a subset of attributes defined in the warehouse management system that are specific to the item;
storing, in a computer-readable storage medium, a database record linking the context to the specified item;
receiving a selection of a flex field from the user, the flex field being capable of storing attribute data values;
receiving a selection of a user definable attribute of the item;
receiving a specification of a descriptive flex field name from the user;
storing, in a computer-readable storage medium, a database record linking the descriptive flex field name to the flex field;
storing the descriptive flex field name and the user definable attribute in a flex field table, the flex field table providing a mapping of the descriptive flex field name to an internal flex field name in a lot table, a serial table, or both;
storing, in a computer-readable storage medium, a database record assigning the context to the item; and
displaying a record of the item indicating that the item is assigned to the specified context, the context including the user definable attribute.

9. The computer-readable storage medium of claim 8, wherein the flex field is configurable by the user, and the flex field is specific to the item.

10. The computer-readable storage medium of claim 8, wherein the flex field is configurable by the user, and the flex field is specific to a category of the item.

11. The computer-readable storage medium of claim 8, wherein at least one of the one or more attributes is a pre-defined attribute.

12. The computer-readable storage medium of claim 8, wherein at least one of the one or more attributes is a user-defined attribute.

13. The computer-readable storage medium of claim 8, wherein at least one of the one or more attributes is a lot attribute.

14. The computer-readable storage medium of claim 8, wherein at least one of the one or more attributes is a serial attribute.

15. An apparatus comprising:
a memory;
a computer-readable storage medium in communication with the memory; and
a processor in communication with the memory and the storage medium, the processor configured to perform a method comprising:
receiving a specification of an item from a user of the warehouse management system;
receiving control data from the user, the control data indicating whether the specified item is lot controlled, serial controlled, or both lot and serial controlled;
receiving a specification of one or more attributes of the item from the user;
receiving a specification of a context defined by the one or more attributes specified for the item, the context representing a subset of attributes defined in the warehouse management system that are specific to the item;
storing, in a computer-readable storage medium, a database record linking the context to the specified item;
receiving a selection of a flex field from the user, the flex field being capable of storing attribute data values;
receiving a selection of a user definable attribute of the item;
receiving a specification of a descriptive flex field name from the user;
storing, in a computer-readable storage medium, a database record linking the descriptive flex field name to the flex field;
storing the descriptive flex field name and the user definable attribute in a flex field table, the flex field table providing a mapping of the descriptive flex field name to an internal flex field name in a lot table, a serial table, or both;
storing, in a computer-readable storage medium, a database record assigning the context to the item; and
displaying a record of the item indicating that the item is assigned to the specified context, the context including the user definable attribute.

16. The apparatus of claim 15, wherein the processor is configured to perform the method based on a plurality of instructions stored in the computer-readable storage medium.

17. The apparatus of claim 15, wherein the flex field is a field capable of storing attribute data values, the field is configurable by the user, and the field is specific to the item.

18. The apparatus of claim 15, wherein the flex field is a field capable of storing attribute data values, the field is configurable by the user, and the field is specific to a category of the item.

19. The apparatus of claim 15, wherein at least one of the one or more attributes is a pre-defined attribute.

20. The apparatus of claim 15, wherein at least one of the one or more attributes is a user-defined attribute.

21. The apparatus of claim 15, wherein at least one of the one or more attributes is a lot attribute.

22. The apparatus of claim 15, wherein at least one of the one or more attributes is a serial attribute.

* * * * *